(12) United States Patent
Blankenship

(10) Patent No.: US 7,737,382 B2
(45) Date of Patent: Jun. 15, 2010

(54) DEVICE FOR PROCESSING WELDING WIRE

(75) Inventor: George D. Blankenship, Chardon, OH (US)

(73) Assignee: Lincoln Global, Inc., Monteray Park, CA (US)

( * ) Notice: Subject to any disclaimer, the term of this patent is extended or adjusted under 35 U.S.C. 154(b) by 685 days.

(21) Appl. No.: 10/813,746

(22) Filed: Apr. 1, 2004

(65) Prior Publication Data
US 2005/0236374 A1    Oct. 27, 2005

(51) Int. Cl.
B23K 15/00    (2006.01)

(52) U.S. Cl. ............... 219/121.11; 219/121.36; 219/121.4

(58) Field of Classification Search ............ 219/121.11, 219/121.36, 121.4, 121.41, 121.43, 121.59
See application file for complete search history.

(56) References Cited

U.S. PATENT DOCUMENTS

| | | | | |
|---|---|---|---|---|
| 4,031,424 | A * | 6/1977 | Penfold et al. | 204/192.12 |
| 5,117,088 | A | 5/1992 | Stava | |
| 5,433,371 | A * | 7/1995 | Morisako | 228/180.5 |
| 5,510,158 | A * | 4/1996 | Hiramoto et al. | 427/582 |
| 5,698,039 | A * | 12/1997 | Patz et al. | 134/1.1 |
| 5,777,867 | A * | 7/1998 | Hongu et al. | 363/134 |
| 6,245,299 | B1 * | 6/2001 | Shiloh et al. | 422/121 |
| 6,365,864 | B1 * | 4/2002 | Stava | 219/50 |
| 6,489,585 | B1 * | 12/2002 | Nakamura et al. | 219/121.52 |
| 6,700,093 | B2 * | 3/2004 | Chiou et al. | 219/121.55 |
| 2004/0026412 | A1 * | 2/2004 | Brande et al. | 219/601 |
| 2004/0045806 | A1 * | 3/2004 | Neff et al. | 204/164 |
| 2004/0048492 | A1 * | 3/2004 | Ishikawa et al. | 438/787 |

FOREIGN PATENT DOCUMENTS

JP    61-058246    * 3/1986

OTHER PUBLICATIONS

B. Eliasson and W. Egli, *Dielectrtic-Barrier Discharges Principle and Applications*, 1997 French Journal of Physics.
T. Opalinska, *Cold Plasma Reactor With Dielectric Barrier Discharge*, Industrial Chemistry Research Institute, Rydygiera 8, 01 793 Warszawa, Poland.

* cited by examiner

*Primary Examiner*—M. Alexandra Elve
(74) *Attorney, Agent, or Firm*—Kevin M. Dunn; Hahn Loeser + Parks LLP

(57) ABSTRACT

A device for processing a wire having an outer surface and moving along a given path in a give direction. The device comprises a conductive contact tube surrounding said path and electrically engageable with the wire as it moves along the path and through the tue and a dielectric sleeve adjacent the contact tube and extending in the given direction from the contact tube and around the path to define an annular gas passage between the dielectric sleeve ad the wire. An inlet for processing gas is adjacent the contact tube in and a conductive electrode sleeve is around the dielectric sleeve so a high frequency, high voltage signal between said electrode sleeve ad the contact tube creates a dielectric barrier discharge plasma of the progressing gas in the annular passage.

45 Claims, 9 Drawing Sheets

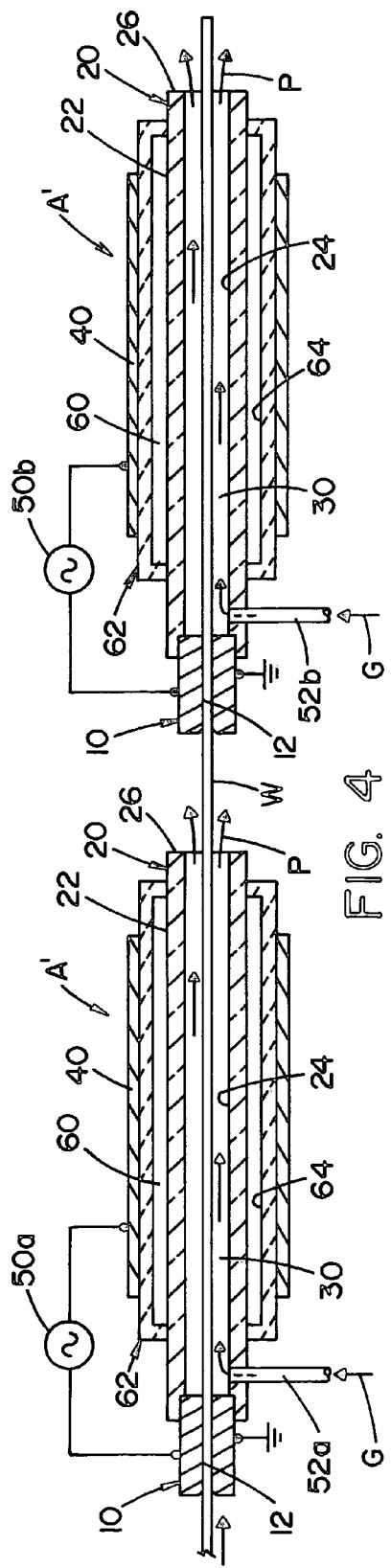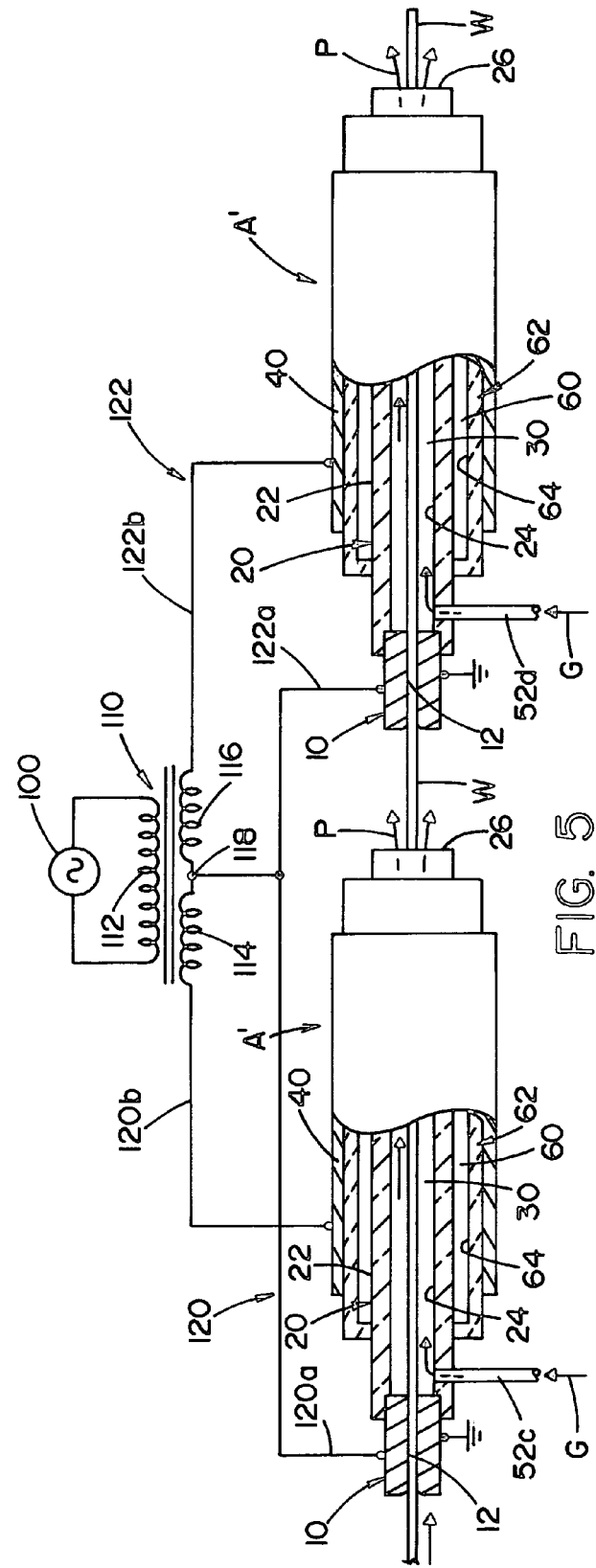

DEVICE FOR PROCESSING WELDING WIRE

The present invention relates to the manufacture of welding wire and more particularly to a device for performing a continuous operation on welding wire as it is moving from the manufacturing process preparatory to winding the wire on a storage spool or in a storage package, such as a drum or box.

INCORPORATION BY REFERENCE

In the manufacturing of electric welding wire, either a solid wire or a cored wire, the wire is processed by drawing dies that result in contaminants on the surface of the wire. The need for cleaning the welding wire and a continuous process of performing this manufacturing process by induction heating is disclosed in Stava U.S. Pat. No. 6,365,864 incorporated by reference as background information regarding processing of welding wire after it has been drawn to size. Furthermore, after the wire is cleaned, it is sometimes necessary or desirable to apply a thin coating of material on the moving wire to enhance subsequent feeding capabilities and arc characteristics. Such coating process can be accomplished by passing the wire through a liquid bath of appropriate composition, with or without electrical deposition assistance. The present invention utilizes a cold plasma in an elongated tunnel or chamber for performing a cleaning function and for depositing a thin layer of material on a rapidly moving welding wire. One prior art process for creating a plasma in an elongated tunnel or chamber is disclosed in United States Publication 2004/0026412 dated Feb. 12, 2004. This processing device produces a plasma in a vacuum chamber by using a confined magnetic induction field generated by induction coils spaced along a moving substrate. This plasma is used as a cleaning, and/or heating medium for the moving substrate, which substrate is illustrated as a wire. Since the present invention relates to the use of a plasma, this publication is incorporated herein as background information for processing a moving substrate in a vacuum chamber utilizing an induced magnetic field created plasma. This is a different type of plasma than anticipated in the present invention, which relates to the concept of a cold plasma as opposed to hot plasma. The cold plasma is formed by the dielectric barrier discharge phenomenon. Such phenomenon is described in a Polish publication by *The Industrial Chemistry Research Institute* entitled *Cold Plasma Reactor with Dielectric Barrier Discharge*. Another article regarding the type of plasma to which the present invention is directed is from a 1997 *French Journal of Physics* and is entitled *Dielectric-Barrier Discharges Principle and Application*. These two publications are incorporated by reference herein as describing the particular type of cold plasma used in practicing the present invention so that details of the relevant plasma technology need not be repeated in the specification. Of course, the use of a cold plasma created by dielectric barrier discharge has been used for various manufacturing and processing operations. One of the operations is disclosed in Chiou U.S. Pat. No. 6,700,093. This patent uses the cold dielectric barrier discharge plasma to destroy and dissipate a perfluorocompound. The destruction and abatement of hazardous compounds is a primary use for dielectric barrier discharge plasma. This common application as shown in Chiou U.S. Pat. No. 6,700,093 that is incorporated by reference as background information. The present invention uses the cold plasma in a positive processing sense, not for the purpose of destroying hazardous compounds. To create the dielectric barrier discharge plasma (DBD plasma) there is a need for a power source to create a high voltage, high frequency signal with a voltage in the range of 1.0-40 kV and a frequency preferably over 18 kHz. Several power supplies are capable of creating the high voltage, high frequency signal needed to establish a dielectric barrier discharge plasma; however, a preferred power source of the present invention is a series resonant device, such as explained generally in Stava U.S. Pat. No. 5,117,088, incorporated by reference herein as background information as to the preferred power source for use in the invention. All of this material is incorporated by reference as background technology that need not be further explained in a description of the present invention.

BACKGROUND OF INVENTION

Electric arc welding normally involves the use of an elongated, continuous welding wire directed toward a workpiece so an electric arc between the electrode or wire and the workpiece melts the welding wire and deposits the molten metal onto the workpiece. The wire for electric arc welding can be solid metal wire, such as steel or aluminum, or a cored metal wire with a center core of alloying materials and/or flux. In welding applications, large amounts of welding wire is stored on reels or in drums or boxes for feeding into the welding process; therefore, a tremendous amount of welding wire is produced. In the manufacture of welding wire, both solid and cored, the wire is processed through a drawing procedure where drawing compounds are often used. Consequently, as the wire exits the manufacturing apparatus, it is often desirable to clean it to remove unwanted material accumulated on the wire. Furthermore, it is somewhat standard practice to deposit a very thin layer onto the cleaned welding wire as it moves along a given path at the exit end of the manufacturing process preparatory to winding the wire onto a spool or laying the wire into packages, such as drums and boxes. The cleaning and coating of the rapidly moving wire has substantially increased the cost and time of the wire making process. Consequently, there is a substantial demand for improved means for cleaning and processing the rapidly moving welding wire as it issues from the drawing stands. One attempt to accomplish the cleaning of the wire is disclosed in Stava U.S. Pat. No. 6,265,864; however, this process has not solved the problems of cleaning the wire and does not accomplish the desired thin coating on the wire which must be done by a coating or dipping process. The present invention relates to an apparatus for cleaning and processing a rapidly moving welding wire, either solid or cored, in a manner to avoid contact with the wire, but sufficient to perform the desired processes on the moving wire.

THE INVENTION

In accordance with the broadest aspect of the invention, a welding wire traveling along a given path passes through a conductive contact tip into an elongated annular chamber or tunnel surrounded by a dielectric barrier of ceramic or glass. By surrounding the dielectric barrier with a conductive sleeve or ring and providing a high voltage, high frequency signal between the conductive tip and the conductive ring, a cold plasma is created around the ring by a phenomenon known as dielectric barrier discharge plasma. This cold plasma is generated by passing the high voltage, high frequency signal from the outer conductive ring to the wire through the dielectric barrier. The plasma in the annular chamber cleans the metal wire, after which the plasma and wire both exit from the chamber into the atmosphere. In this manner, a cleaning gas introduced adjacent the conductive tip moves with the wire and constitutes the gas forming the plasma. The gas in the form of a cold plasma is exhausted from the chamber together with the wire moving through the annular plasma chamber. The frequency of the power source is generally above 500 Hz and preferably above 18 kHz. Typically, the frequency is approximately 200 kHz. The applied voltage is 1000 volts and is preferably greater than 2.0 kV. Typically, the voltage is approximately 8.0 kV. The annular gap between the dielectric sleeve and the wire has a width of approximately 0.2-3.0 cm. The pressure of the processing or cleaning gas is sufficient to cause the plasma to exit the far end of the cleaning tunnel or chamber. A variety of power sources can be used to obtain the high voltage, high frequency signal necessary to create the dielectric barrier discharge plasma in the annular gap between the dielectric sleeve and the wire. An electrical driving source can be an oscillator constructed using solid state electronic devices, such as IGBTs and MOSFETs. A well known arrangement to produce the desired high voltage, high frequency signal is a series resonant tank circuit composed of an inductor and capacitor that is forced to resonate, as taught by Stava U.S. Pat. No. 5,117,088. This power source is the preferred power source for use in the present invention. Another power source that is used for the plasma creating signal is a hard-switched square wave signal in the region of 20-80 kHz. Higher frequency signals may use spark gaps, vacuum tubes, such as a high power triode, or microwave tubes, such as a magneton or klystron. The plasma discharge become more uniform at higher frequency but the cost of the extremely high frequency power sources become quite high. A fast pulsing power source using a MOSFET or thyratron tube is still a further way of producing a signal suitable to produce a plasma by the dielectric barrier discharge phenomenon. The pulse, to be effective, must have a very short duration and a very fast rise time and fall time. All of these power sources will produce a high voltage, high frequency signal to create a plasma in the device constructed in accordance with the present invention. The dielectric sleeve or insulator may be constructed of a ceramic, as alumina or boron nitride, a glass such as borosilicate or lime glass or polymer, such as Teflon. The uniformity of the plasma discharge may be increased by making the conductive ring or sleeve around the dielectric sleeve from a fine wire mesh.

The description so far relates to a tunnel or tube for cleaning a wire by using a cleaning gas directed into the annular gap between a moving welding wire and a surrounding dielectric sleeve. The cleaning gas may be replaced in the same tube or device with an active material that is heated and vaporized for depositing a thin layer of material on a moving wire using cold plasma as so far described. Thus, the present invention relates to a device for cleaning or depositing a thin layer of material onto a wire, which wire passes through an elongated chamber filled with a cold plasma created by the dielectric barrier discharge phenomenon.

In accordance with another aspect of the invention, the dielectric insulator or sleeve is transparent such as a glass dielectric. Around the transparent sleeve is a sealed chamber between the dielectric sleeve and the conductive electrode or outer ring. This encircling chamber is created by adding a second dielectric sleeve about the transparent dielectric sleeve spaced from the moving wire. The fixed chamber between the two dielectric sleeves is sealed and contains a specific gas mixture at any desired pressure. This chamber when subjected to the high voltage, high frequency signal creates an ultraviolet light wherein the light energy is generated by agitating the molecules in the fixed chamber by dielectrically exciting the gas molecules. The chamber forms a discharge gap for creating light that passes through the internal dielectric sleeve which is transparent. The width of the lamp or light chamber is typically in the range of 1.5 mm but can range from between about 0.2-6.0 mm. The discharge gap in the light chamber typically contains a mixture of helium and nitrogen in a 75:25 ratio. Carbon dioxide may be added in a ratio of helium to nitrogen to carbon dioxide of 70:20:5. This sealed chamber may also contain small amounts argon, xenon, or krypton to regulate the electron temperature within the sealed chamber. Alternatively, the gas may be pure xenon or a helium; xenon mixture. Lithium metal vapor also works. The outer surface of the second dielectric sleeve, or the inner surface of the outer conductive ring or sleeve, may be coated or polished to form a reflective mirror to reflect emitted light energy radially inwardly toward the inner plasma chamber defined by the internal dielectric sleeve and the moving wire. Cleaning gas injected into the annular plasma gap or passageway moves along the axis of the wire and serves the purpose of cleaning the wire as the gas is formed into a plasma and moves with the wire through the chamber defined by the innermost dielectric sleeve. The cleaning gas within the annular plasma gap or passageway is excited by the electrical stimulation of the dielectric barrier discharge and the light radiation emitted from the surrounding lamp chamber if such chamber is used in the particular embodiment of the invention. The electrical stimulated plasma gas is chemically reactive. Additionally, the surface of the wire is chemically and thermally activated in electron discharges that bombard the wire as it functions alternately as the cathode and anode of the dielectric barrier discharge device. The electron discharge sites tend to cluster in areas of surface contamination, thus accelerating the cleaning process using in the present invention.

In manufacturing welding wire, drawing lubricants are a primary contaminant on the outer surface of the welding wire. High pressure associated with the wire drawing process requires use of greases, soaps or inorganic slip agents to be added to the wire to extend the life of a drawing die and avoid wire breakage. Many of these lubricants contain hydrogen which is usually detrimental to electric arc welding. The surface contaminants must be removed or oxidized. Wire cleaning is accomplished by using the present invention. The cleaning gas used in the invention is preferably oxygen. However, the cleaning gas may be composed of fractions of oxygen, nitrogen, argon, helium, neon, xenon, krypton, carbon dioxide, hydrogen, nitrous oxide, steam and other gases, including air. In this manner, the present invention is used to clean moving welding wire, either solid or cored. In the broadest aspect of the invention, only a single dielectric sleeve is employed and the chamber between the sleeve and wire is where a plasma of the cleaning gas is created by use of a high voltage, high frequency power source. In accordance with another aspect of the invention, the inner dielectric is transparent and is surrounded by a second dielectric sleeve defining an outer light or lamp chamber between the outer conductive electrode sleeve and the inner dielectric sleeve. Both aspects of the invention are used for cleaning the moving wire.

The present invention without the outer sealed light chamber can also be used with an activated material, such as an alkali metal, added to the surface of the wire. This feature is accomplished by introducing vapors or powder in the coating material to the plasma stream of the present invention. Two series operated devices constructed in accordance with the present invention can be used around a single wire moving in a given direction. The first device is used to clean the wire and the second device is used to add a desired thin coating of active material onto the clean wire. In the second device, vapors are generated by controlled heating or boiling or a chemical reaction involving the material to be coated onto the moving wire. Powders or atomized mists of materials may also be introduced in combination with the gas used to create a plasma. There are two primary reasons for adding materials to the surface of the wire. Certain elements are known to affect the stability of the welding arc. These materials are present on the wire surface in small quantities representing 5-100 ppm of the surface material on the wire. Elements of this category are potassium, sodium, cesium, rubidium, lithium, barium and calcium. These alkali metal elements are now introduced by the welding wire manufacturer using a variety of proprietary methods. Uniform application is very difficult given the small quantities required and application constraints imposed by the available welding wire manufacturing process. Thus, one added feature of the invention is the ability to use the novel device to coat the cleaned welding wire. Furthermore, certain materials are known to inhibit rust or oxidation of the welding wire during shipment and storage. Examples of sacrificial anodes for use with iron-based wire include magnesium, zinc and aluminum. Because of the electrochemistry involved, these elements may not be plated onto the surface of the wire. A dipping or galvanized process is possible, but the deposition rate is too high and the resulting excessive material interferes with the arc welding process. Plasma deposition, as used in the present invention, provides a means to add a small and controlled amount of rust inhibitor to the wire surface. Consequently, the use of active material for coating the wire can be done by adding the material to the cleaning gas input of the present invention.

As the welding wire exits from the manufacturing process, it is passed through a device constructed in accordance with the present invention, either with or without an outer sealed chamber for creating light energy. The present invention can be used in a cascade arrangement wherein two or more successive devices are used to clean the wire. Furthermore, one novel device can be used to clean the wire and the other novel device can be used to coat the wire with a very fine layer of desired material by the procedure explained above. A variety of transform arrangements can be used when two of the devices are cascaded together. For instance, a single high voltage, high frequency power supply can direct an AC signal to the primary of a transformer having two series connected secondaries with a center tap. One secondary and the center tap drives one novel device and the other secondary and the center tap are in a series circuit to drive the second novel device. Consequently, two essentially identical cascaded devices can be driven by a single power supply using a transformer with two secondary sections. The first device cleans the wire and a second device coats active material to the wire. By using the same power supply and transformer with a single primary and two secondary windings as discussed above, a single novel device can be used where its outer conductive electrode sleeve is divided into two separate sleeve segments. In this manner, a single novel device has a cascade driving effect where a first plasma is created in the entrant end of the device and a second plasma is created near the exit end of the device.

Other arrangements for driving two or more segments of the conductive electrode sleeve on a single device are within the scope of the present invention. For instance, a plurality of sleeves can be spaced along a single device having a single dielectric sleeve and/or a single sealed light emitting chamber. Each of the individual segments of the outer conductive sleeve can be driven by the same signal to provide spaced plasma areas in the annular plasma gap. Preferably the segments are driven in sequence to give a traveling plasma wave.

In accordance with an aspect of the invention, a single high frequency power source is connected to a plurality of series resonant circuits as shown in Stava U.S. Pat. No. 5,117,088. These circuits are tuned to different frequencies. The input power supply is varied by use of a signal from a voltage controlled oscillator. The respective series resonant circuits resonate when the drive signal matches its tuned frequency. By using coaxial transformers in a matrix, each transformer can be connected to one series resonant circuit associated with one of the segments of the conductive electrode sleeve. The plasma of the present invention transfers to successive locations in the direction of movement of the wire. Consequently, the plasma moves from the front to the rear of the plasma chamber or annular gap in accordance with the change in frequency of the drive signal from the voltage controlled oscillator. In this manner, a single dielectric barrier discharge gap has a moving plasma. Ths initiates a plasma wave within the plasma gap. By using a transformer matrix, there is a predictable inductance value in each of the series resonants circuits resulting in less unit-per-unit variation in resonant frequency and low production costs. The transformer arrangement with series resonant circuits employed to drive the multiple barrier discharge devices arranged in a module fashion is a scheme that initiates a plasma wave within the present invention.

By using a plurality of series resonant circuits tuned to different resonant frequencies, a voltage controlled oscillator can be swept through a range of frequencies by a sawtooth ramp signal. As the frequency of the drive signal is swept across the range by the oscillator, each series resonant circuit enters and leaves resonants at a different time. As a result, each of the series resonant circuits resonants at a different time. By using this novel high voltage, high frequency matrix type power supply to drive a series of conductive sleeves arranged on a single novel device the successive conductive segments are arranged with the lowest to highest frequencies so a traveling wave is introduced into the inner plasma gap of the device. By using this specially designed power source comprising a plurality of series resonant circuits to create a plasma wave traveling through the device, advantageous processing is obtained. A typical wire drawing speed is 20 meters/second. If the barrier discharge device is 2.0 meters long, which is somewhat normal, the wire has a residence time of 0.10 seconds in the plasma. The voltage controlled oscillator is swept through its range of operation in 5.0 ms. Any small increment of wire will be exposed to a 20 wave crest as it moves through the tube extending a distance of 2.0 meters. The velocity of the traveling plasma wave is 400 meters/second or very near the sonic velocity. The sweep time of the voltage controlled oscillator could be adjusted to achieve optimum wave behavior. For an average frequency of 120 kHz, each resonant circuit element of the power supply has 120 cycles to move through its resonance state. The resonant frequency may be adjusted by tuning the series L-C circuit elements to achieve the optimum performance. Thus, there are tremendous advantages using the unique power source employed in the embodiment of the present invention wherein the long plasma processing tube is divided into sections by the conductive electrode sleeve being divided into spaced segments, each driven at a different frequency and swept by the variable output of a voltage controlled oscillator driven with a voltage signal from a sawtooth generator. Other modifications can be made in this aspect of the present invention to take advantage of the moving plasma wave for processing the wire passing through a device constructed in accordance with the present invention.

In accordance with the present invention there is provided a device for cleaning a wire moving along a given path in a given direction. The device comprises a conductive contact tube surrounding the path and electrically engageable with the wire as it moves along the path and through the contact tube, a dielectric sleeve adjacent the contact tube and extending in the given direction and defining an annular gas passage between the sleeve and the wire and a gas inlet in the package adjacent the contact tube to flow a processing gas into said passage to move in a given direction. A conductive electrode sleeve around the dielectric sleeve allows a signal to be applied between the contact tube and the conductive electrode sleeve. A power source to create a high voltage, high frequency signal is used to cause the gas flowing through the annular passage or gap to be ionized into a cold plasma using the dielectric barrier discharge phenomenon. The processing gas is preferably a cleaning gas, such as air (oxygen) and other gases such as oxygen, nitrogen, argon, helium, neon, carbon dioxide, hydrogen, steam and air, to name a few of the preferred cleaning gases. In accordance with the alternate use of the present invention, a processing gas is formed into a plasma and is used to coat the outer surface of the moving wire as it passes through the device. This single device is generally about 1.0-3.0 meters long. A number of devices may be operated in series. In practice, the wire moves between two parallel pulleys each having three runs of wire so six lengths of wire pass between the pulleys. Six cleaning devices 40" in length are located between the pulleys as individual cleaning tunnels. This gives about 6 meters of exposed process wire by the six devices.

The frequency of the signal to create the plasma is greater than 500 Hz and preferably greater than about 18 kHz. The voltage is greater than about 1000 volts and is preferably in the general range of 1-40 kV. The passage or gap in which the gas is formed into a plasma has a width in the general range of 0.2-3.0 cm. The dielectric sleeve is formed from ceramic, glass or polymer, such as Teflon. In the preferred embodiment of the present invention, the dielectric sleeve is transparent and formed from a glass dielectric. A sealed light emitting cylindrical chamber concentric with the path of the moving wire and between conductive electrode sleeve and a dielectric sleeve is filled with a light emitting gas. The molecules in the light chamber are electrically excited by the signal from the power source. The light emitting chamber around the plasma passage has a width in the general range of 1.0-2.0 mm. The light emitting gas in the chamber has, in the preferred embodiment, 50-75% by moles helium, 0-50 by moles nitrogen, and possibly other gaseous materials such as carbon dioxide, argon, etc. Pure xenon can be used. The light or ultraviolet light from the excited molecules in the light emitting chamber pass through the transparent dielectric forming the plasma chamber or gap to enhance the plasma process. The wire is subjected to a cold plasma as well as ultraviolet energy.

A variety of power sources can create the necessary high voltage, high frequency signal to cause a plasma by the gas flowing through the plasma passage around the wire and inside of the dielectric sleeve. In the preferred embodiment, the power source involves a series resonant circuit, as illustrated generally in Stava U.S. Pat. No. 5,117,088. This type of power source can be used to drive a transformer coupled series resonant circuit that is designed to initiate a plasma wave within the inner plasma chamber or gap. This can be done by a matrix transformer arrangement that drives multiple barrier discharge segments around the plasma chamber at spaced locations. The transformer arrangement having a number of series resonant circuits is driven by a variable frequency signal device, such as a voltage controlled oscillator having an input signal formed from a successive variable voltage. Thus, the output of the voltage controlled oscillator has different frequencies. The plurality of series resonant circuits are tuned to create a moving plasma wave when the series circuits are connected to successive segments of the encircling conductive electrode sleeve around the plasma chamber.

In accordance with another aspect of the invention, there is provided a method of cleaning a moving wire including forming a chamber around the moving wire, creating a dielectric barrier discharge plasma in the chamber and directing a cleaning gas into the chamber for cleaning the moving wire by a cold plasma. This same method is used for coating the wire wherein a gaseous active material is directed into the plasma chamber for coating the moving wire. For instance, gas introduced into the chamber or passage is the gas forming the plasma and it carries the active coating material. The method is performed over a distance in the general range of 1.0-3.0 meters. The cleaning gas or coating gas is any type of processing gas to be ionized into a plasma by the dielectric barrier discharge phenomenon. This method can be used with a surrounding light emitting chamber extending along the length of the device to combine the cold plasma with light energy to enhance the processing performed on the outer surface of the moving wire. The wire is preferably an electric welding wire, either solid or cored. The process can be enhanced by providing a plurality of separately energized conductor sleeve segments along the length of the processing path so that the plasma can be created in a plasma wave moving in the same direction as the wire. In this embodiment, an induction coil can be provided between two segments of the sleeve segments to magnetically constrict the plasma into different and separate areas.

The primary object of the present invention is the provision of a device employing a barrier discharge plasma for processing a moving wire, as a welding wire, solid or cored.

Another object of the present invention is the provision of a device, as defined above, which device can be used to clean and/or coat a moving welding wire as it issues from its manufacturing line.

Yet a further object of the present invention is the provision of a device, as defined above, which device is mounted on the outlet end of a wire processing line to clean and/or coat the moving wire by using a dielectric barrier discharge plasma so that the wire is not physically touched except by the plasma.

Still a further object of the present invention is the provision of a device, as defined above, which device also incorporates a surrounding light emitting source to combine the cold plasma with the light energy of the source to process a moving wire.

Another object of the present invention is the provision of a novel power source using a matrix transformer arrangement to drive multiple dielectric barrier discharge elements positioned along a tunnel or chamber for processing the moving wire with a cold plasma.

Still another object of the present invention is the provision of a device, as defined above, which device employs a plurality of series resonant circuits to generate a moving plasma wave in the tunnel or chamber in which the wire is passed for processing.

Yet another object of the present invention is the provision of a method for processing a moving wire using a dielectric barrier discharge plasma with or without an enhancement by a surrounding light source to process a moving wire, such as a welding wire, both solid and cored.

These and other objects and advantages will become apparent from the following description taken together with the accompanying drawings.

BRIEF DESCRIPTION OF DRAWINGS

FIG. 4 is a cross-sectional view of two tandem arranged devices constructed in accordance with the second embodiment of the present invention;

FIG. 5 is a cross-sectional view, similar to FIG. 4 with a single power source driving the tandem device constructed in accordance with the invention;

PREFERRED EMBODIMENTS

Figure 1:
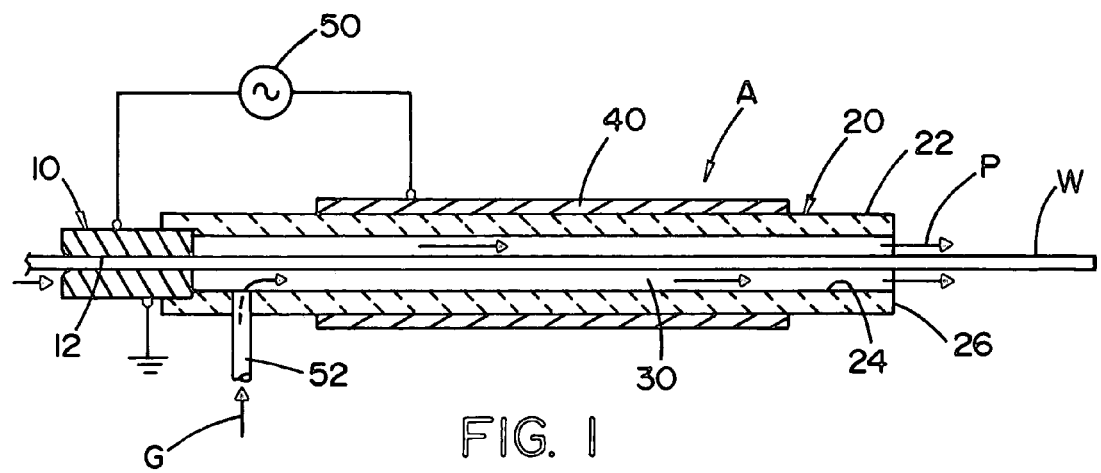
FIG. 1 is a cross-sectional view of the preferred embodiment of the present invention.
Figure 2:
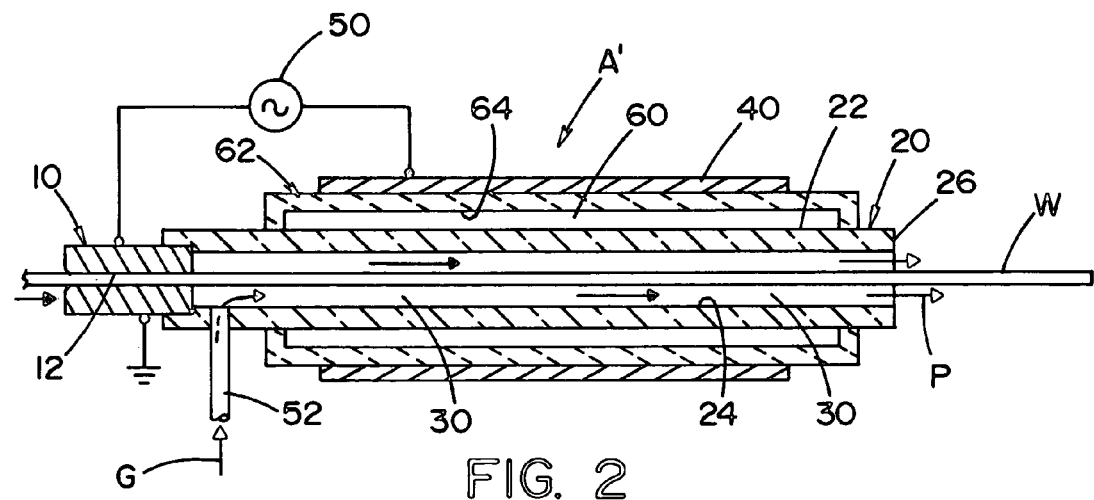
FIG. 2 is a cross-sectional view of a second embodiment of the present invention.

Referring now to the drawings wherein the showings are for the purpose of illustrating preferred embodiments only and not for the purpose of limiting same, FIG. 1 illustrates a device or tunnel A for processing a moving wire W, preferably in the form of a welding wire, either solid or cored, as the wire issues from a wire manufacturing line. The description of the invention and its details described in the introductory portion of this description are incorporated again by reference herein. Tunnel or device A includes a grounded contact tube 10 having a central passage or bore 12 through which wire W moves as it travels in a horizontal pass shown in FIG. 1. Contact tube 10 provides electrical contact with the moving wire and has, at its outlet end, a dielectric sleeve 20 with a general length of 1-3 meters. Sleeve 20 includes an outer cylindrical surface 22 and an inner cylindrical surface 24 spaced from wire W to define a wire passage or annular gap 30 extending from tube 10 to the outlet end 26 of dielectric sleeve 20. To create a dielectric barrier discharge plasma in passage or gap 30, device A has a surrounding, elongated conductive electrode sleeve 40. A high voltage, high frequency power source 50 produces a signal between sleeve 40 and wire W so a cold plasma is created in elongated, annular gap or passage 30 using gas G directed to passage 30 by inlet 52. The cold plasma created in gap 30 issues from end 26 of sleeve 20 as indicated by arrows P indicative of a plasma issuing around wire W. As described earlier, power source 50 has a voltage over 1000 volts and a frequency greater than 500 Hz and preferably substantially greater than 18 kHz. Consequently, power source 50 creates a signal to generate a dielectric barrier discharge plasma P in device A. As wire W moves through elongated sleeve 20, plasma P cleans off any lubricant or other substance on the surface of wire W. The removed substance may be greases, soaps or inorganic slip agents added to the wire to extend the life of the dies used to draw the welding wire. These contaminants may be removed or oxidized by cleaning gas introduced into inlet 52 of device A. The typical wire moves at a speed of about 20 meters per second. The resonant time in the plasma is about 0.10 seconds during the cleaning or other processing operation. The invention is primarily directed to plasma P created in passage or annular gap 30 to process the surface of moving wire W. To enhance the operation of the plasma, another embodiment of the invention is illustrated in FIG. 2. In this embodiment of the invention, a sealed light emitting chamber 60 is placed around sleeve 20 and this sleeve is formed of a transparent dielectric, such as glass. Chamber 60 has housing 62 constituting a second dielectric sleeve surrounding chamber 60. This outer dielectric sleeve is formed of ceramic and has an inwardly facing cylindrical surface 64 polished or provided with a mirror finish for light reflection from surface 64 and chamber 60 into plasma passage or annular gap 30. This ultraviolet light enhances the operation of device A'. The light emitting chamber 60 is created by adding a second dielectric layer or sleeve 62 as a part of a sealed chamber containing a specific gas mixture at a desired pressure. Light energy is generated by the signal from power source 50 that excites the gas molecules to emit ultraviolet light toward passage 30. The width of the chamber forms discharge gap within the chamber which has a width generally in the range of 0.2-6.0 mms. The discharge gap that forms the light chamber 60 typically contains a mixture of helium and nitrogen in the ratio of 75:25. The chamber may also contain small amounts of carbon dioxide, argon, xenon or krypton. Alternatively, the chamber may include pure xenon.

Gas G introduced into annular gap 30 at inlet 52 is a cleaning gas that is formed into a plasma P for cleaning wire W. Ultraviolet light energy from chamber 60 enhances this cleaning operation. Since an AC signal is used to create the plasma P, the surface of the wire is mechanically and thermally activated by electron discharges that bombard the wire, which wire functions alternately as a cathode and as an anode of the barrier discharge device. The electron discharge sites on the wire tend to cluster in the area of the surface contamination, thus accelerating the cleaning process using device A or device A'. The invention involves device A and the enhanced aspect of the invention device A' which will be disclosed in various alternative applications in subsequent drawings.

Figure 3:
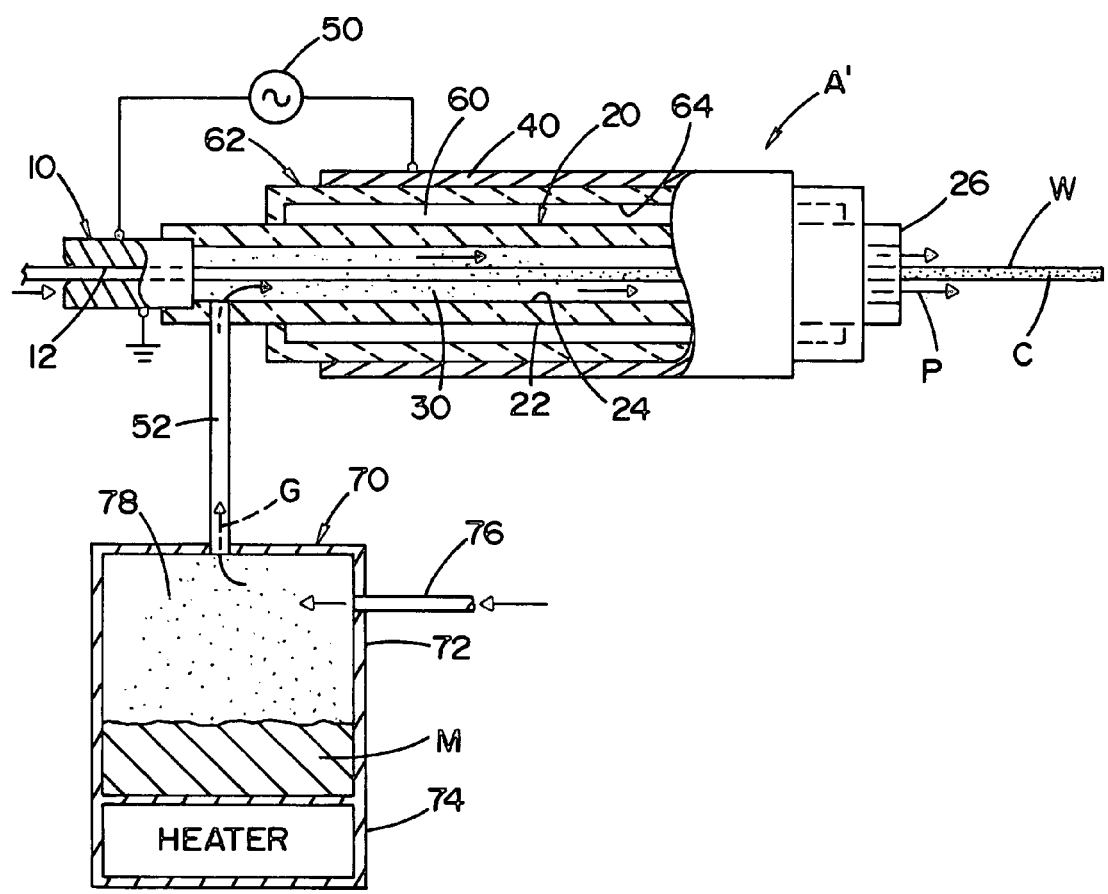
FIG. 3 is a cross-sectional view of the second embodiment used for coating a moving wire.

Another embodiment of the invention is illustrated in FIG. 3 wherein the cleaning device A or device A' are used for coating wire W, as indicated by the coating C on the wire at the exit end 26 of device A'. The active processing gas is introduced into inlet 52 of previously described device A'. To illustrate structure for accomplishing this second use of device A', i.e. coating a clean wire W, FIG. 3 illustrates an active material M in a process chamber 70 having an upper portion 72 and a lower heating portion 74. A carrier gas is introduced into portion 72 of chamber 70 at inlet 76 if a carrier gas is required for generating the desired processing gas G used to coat the outer surface of wire W. In the illustrated embodiment, material M is vaporized or formed into particles 78 that constitute gas G or are entrained in a carrier gas from inlet 76. The use of a reaction vessel or chamber 70 to introduce an active process gas into annular gap 30 for formation of plasma P can take different structural forms. Vessel or chamber 70 is only a schematic representation of a supply for the active coating material. A specific beneficial active material for coating wire W is alkali metals that are coated on the surface of wire W. The metal may be introduced as vapors or powders 78 into the inner plasma stream of annular gap 30. The vapors are generated by controlled heating or boiling or a sustained chemical reaction in vessel 70. Powders or atomized mists of materials may be injected into inlet 52 in combination with a gas stream from inlet 76.

There are two primary reasons to add material to the outside surface of wire W. Certain elements are known to affect the stability of the welding arc. However, these materials are required in very small quantities representing 5-100 ppm of the wire and are only on the surface of the wire. Elements in this category are potassium, sodium, cesium, and other alkali metals. In the past, uniform application of these materials was quite difficult due to the very small quantities required. Other materials added by the device shown in FIG. 3 inhibit rusting or oxidation of the welding wire during shipment and storage. Such materials are sacrificial anodes for use with iron-based wire and includes magnesium, zinc and aluminum. Due to the electrochemistry, such elements may not be plated onto the surface of the wire. A dipping or galvanizing process is possible but the deposition rate is too high and excessive material interferes with the arc welding process. Use of the present invention allows the plasma to deposit the material onto the surface whereby a small and controlled amount of rust inhibitor can be applied as a coating C to wire W.

The two embodiments shown in FIG. 1 and FIG. 2 can be used in tandem, to provide a series of cleaning tunnels or clean tunnel followed by a coating tunnel. Other desired groupings of devices A or devices A' can be provided. Such groupings of devices are illustrated in FIGS. 4 and 5 as employing the embodiment of the invention shown in FIG. 2. In FIG. 4, two devices A' are cascaded or located at spaced positions on the path of movement of the wire. This provides two separate modules with separate power sources 50a, 50b, respectively. Inlets 52a, 52b introduce the appropriate processing gas into chamber 30, where it is formed into a plasma by the dielectric barrier discharge phenomenon. In the cascade or tandem arrangement shown in FIG. 4, both devices A' can be used for cleaning wire W or, in the alternative, the first device A' is used for cleaning by introducing a cleaning gas into inlet 52a and the second device is used for coating by introducing an active coating material into inlet 52b. Of course, more than two devices A' can be positioned in tandem or a cascade arrangement so wire W passes through a succession of devices, each constructed in accordance with the present invention. Of course, device A could be used in tandem or used in combination with device A'. All of these arrangements are within the intended use of the present invention. In FIG. 5, only two tandem devices A' are shown as processing wire W. In this arrangement, a single power source 100 is used to create the high voltage, high frequency signal across contact tube 50 and electrode 40 of the tandem arranged device A'. In this illustrated embodiment of the invention, power source 100 is connected to transformer 110 having a primary 112 and two secondaries 114, 116 with a center tap 118. In this driving arrangement for the tandem devices A', a first circuit 120 is connected in series with secondary 114 and includes leads 120a, 120b for driving the first device A'. In a like manner, a second series circuit 122 includes secondary 116 and leads 122a, 122b for driving the second device A'. It is apparent there is a capacitance between sleeves 40a and 40b and wire W as represented by phantom capacitors C1, C2. Lead 120a and circuit 120 can be removed. This configuration will still function by the inherent capacitive coupling alone. In this illustrated arrangement, a cleaning gas is introduced at inlet 52c to clean wire W passing through the first tunnel or cleaning device. Then, a coating gas is introduced into chamber 30 of the second device A' at inlet 52d. In this manner, wire W is first cleaned and coated as previously described. Two devices can be cleaning devices or coating devices or combinations thereof.

Figure 6:
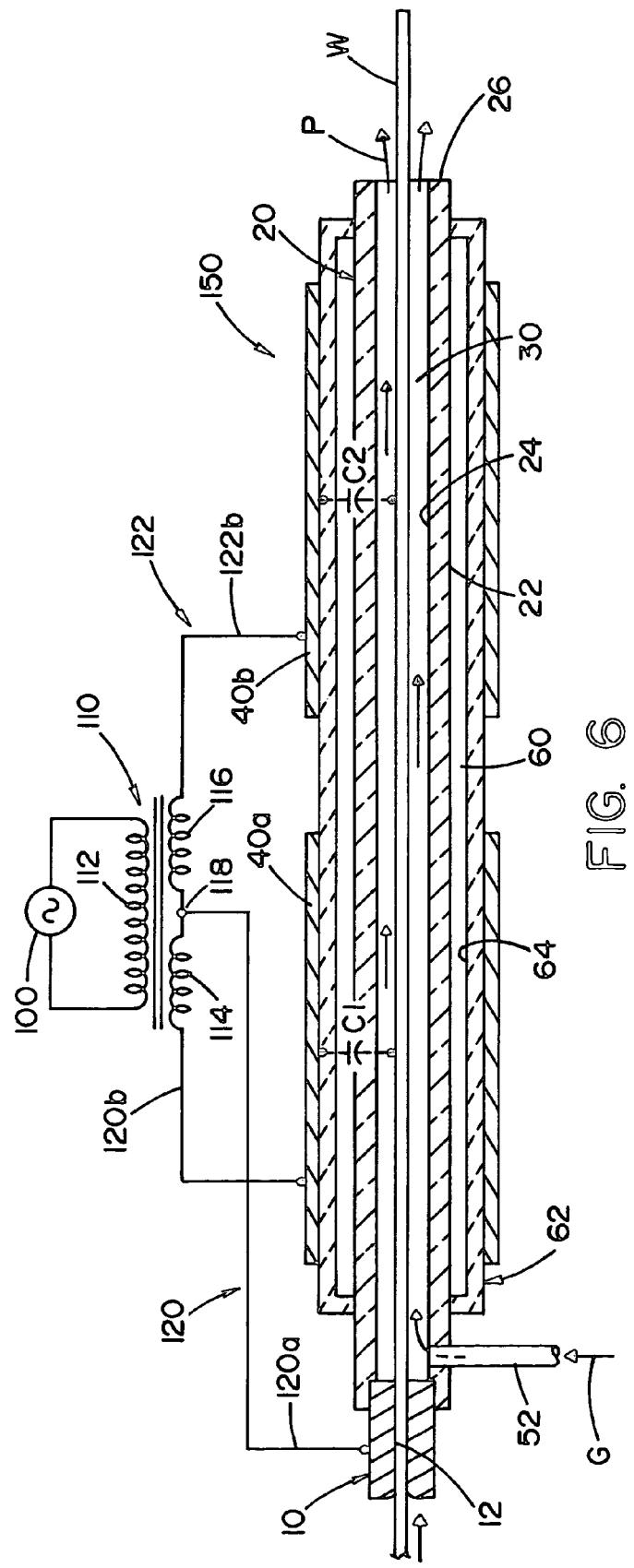
FIG. 6 is a cross-sectional view of a preferred device constructed in accordance with the present invention, wherein the outer conductive electrode sleeve is divided into two spaced segments and a single power source drives both conductive segments of the device.

The use of power source 100 of FIG. 5 to drive a single cleaning or processing device 150 is illustrated in FIG. 6 where like numbers of various components are used. In this embodiment, conductive sleeve 40 is divided into spaced sleeve segments 40a, 40b. These two segments are spaced along the axis of a single dielectric barrier device 150. These electrodes or segments are energized by power source 100 to direct the same voltage and frequency through the axially spaced conductors 40a, 40b but in different phases. The transformer arrangement provides a first circuit 120 having leads 120a, 120b as previously described. The second series circuit 122 has the lead 122b as previously described. In this embodiment, lead 120a is used in combination with lead 122b to form the second series circuit 122. Consequently, the plasma creating signal is offset 180° out of phase between the two encircling electrodes of segments 40a, 40b. The second plasma is somewhat different than the first plasma to provide an alternative cleaning action on the moving wire. Other arrangements could be used for driving conductive segments 40a, 40b, such as two power sources, one for each segment. With separate power sources, the phase and voltage or frequency of each segment can be changed as desired.

Figure 7:
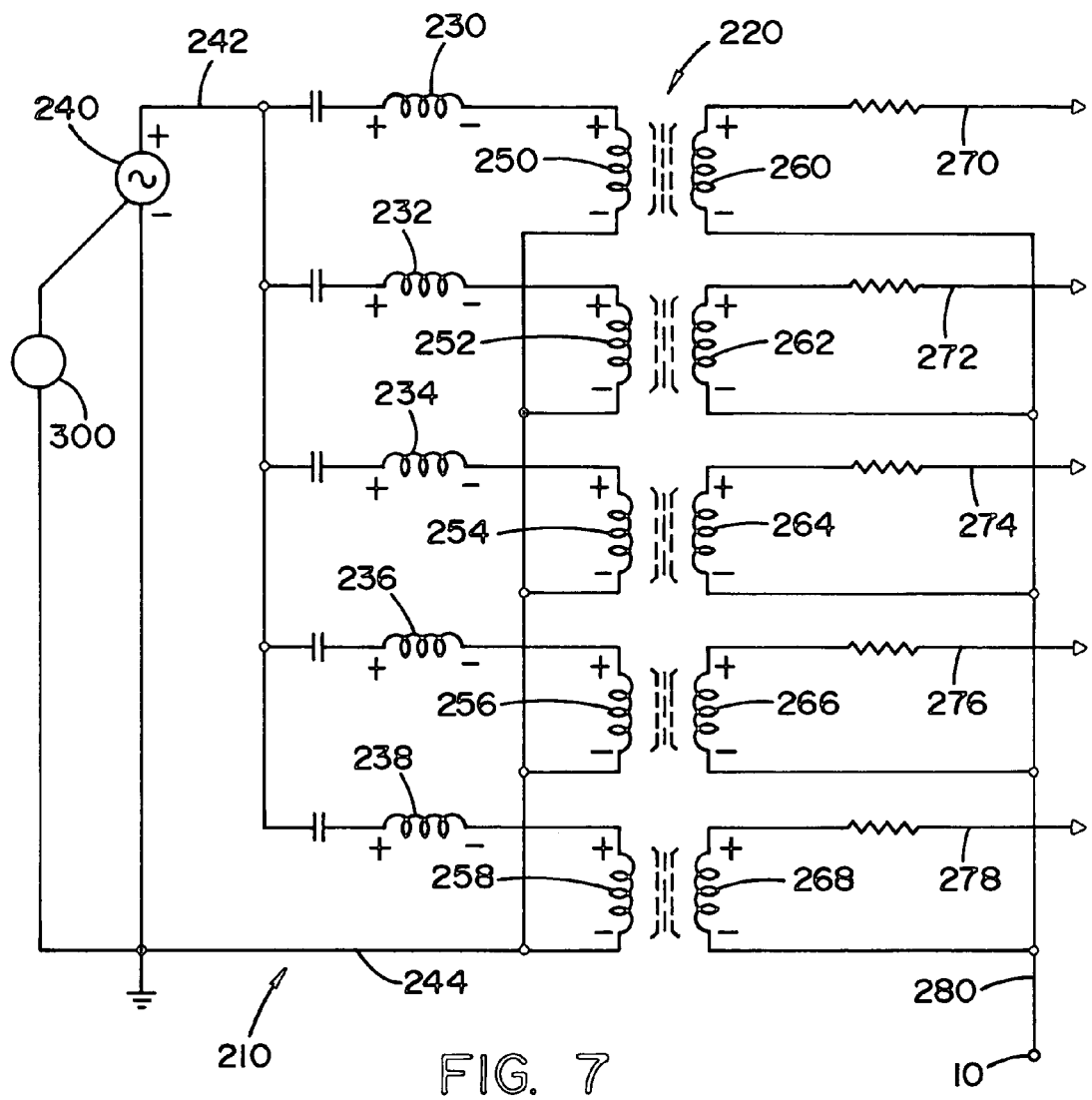
FIG. 7 is a wiring diagram of a matrix transformer arrangement used as a power source to drive several segments constituting the conductive electrode sleeve around a device constructed in accordance with the present invention together with its input drive circuit.
Figure 8:
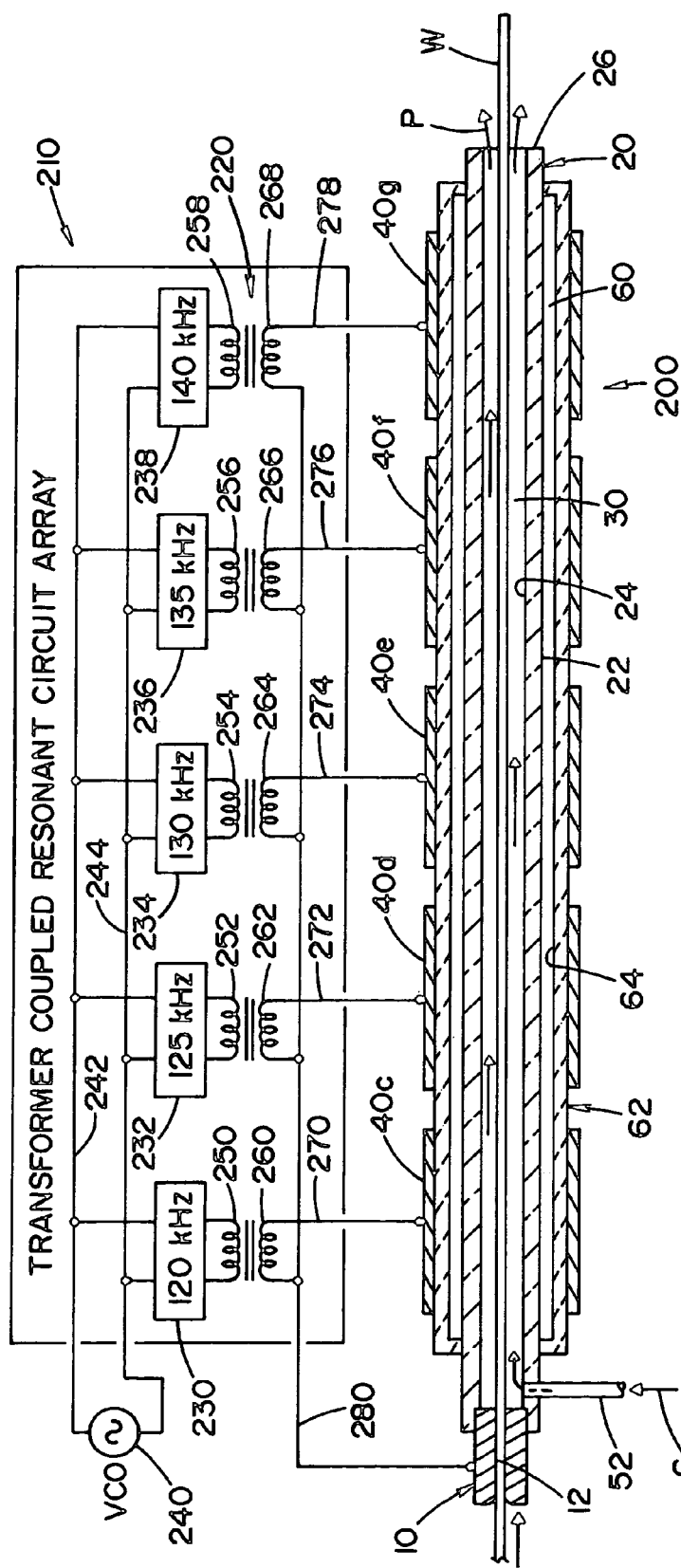
FIG. 8 is a cross-sectional drawing combined with a block diagram and wiring diagram using the power source of FIG. 7 in driving a plurality of conductive segments constituting the surrounding conductive electrode sleeve of the present invention.
Figure 9:
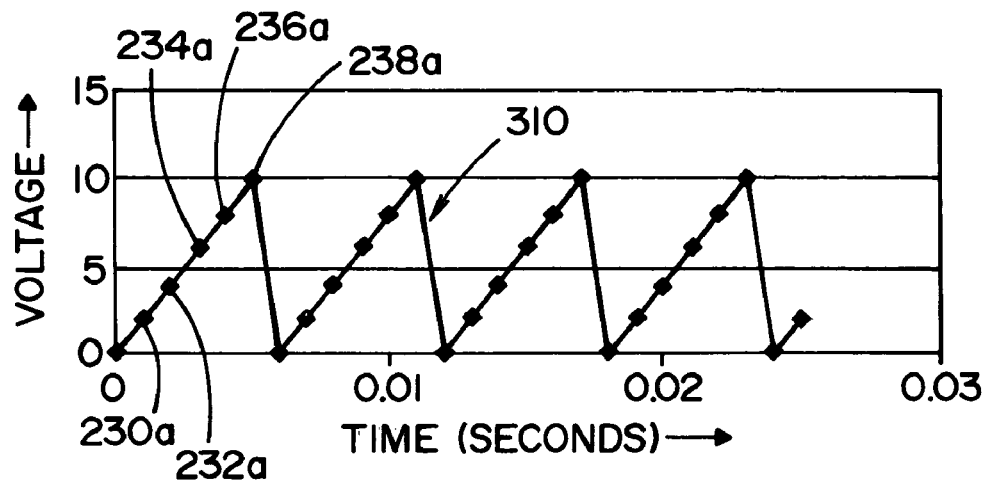
FIG. 9 is a voltage chart of the output signal of the input drive circuit in FIG. 7 for controlling the output frequency to the series resonant circuits.
Figure 10:
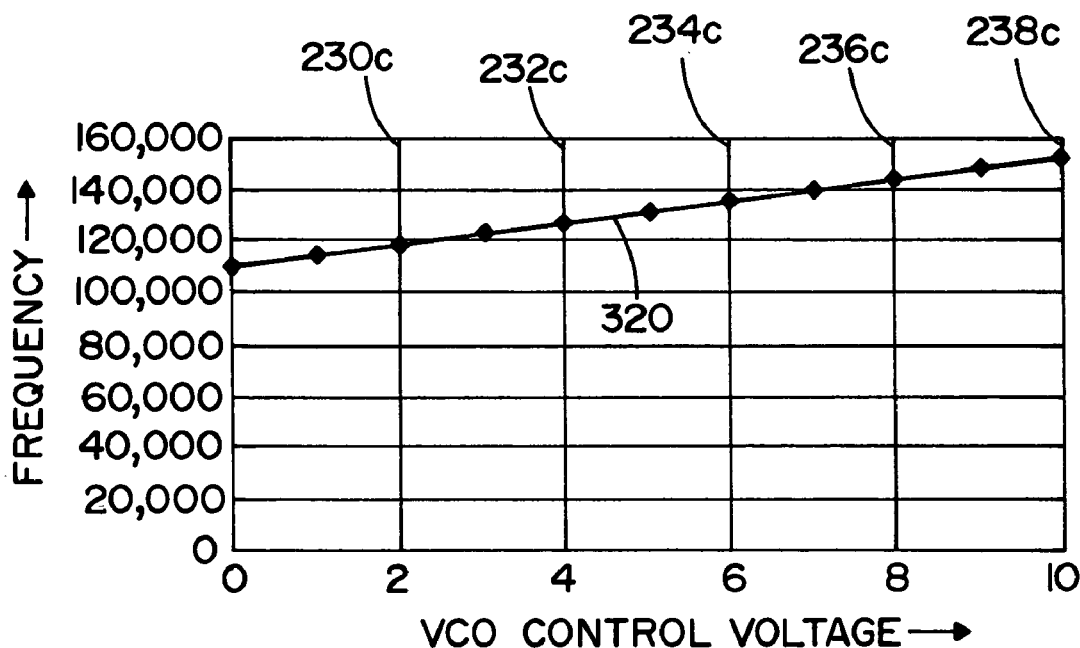
FIG. 10 is a graph of the frequency created at the output of the drive circuit shown in FIG. 7 and used in FIG. 8.
Figure 11:
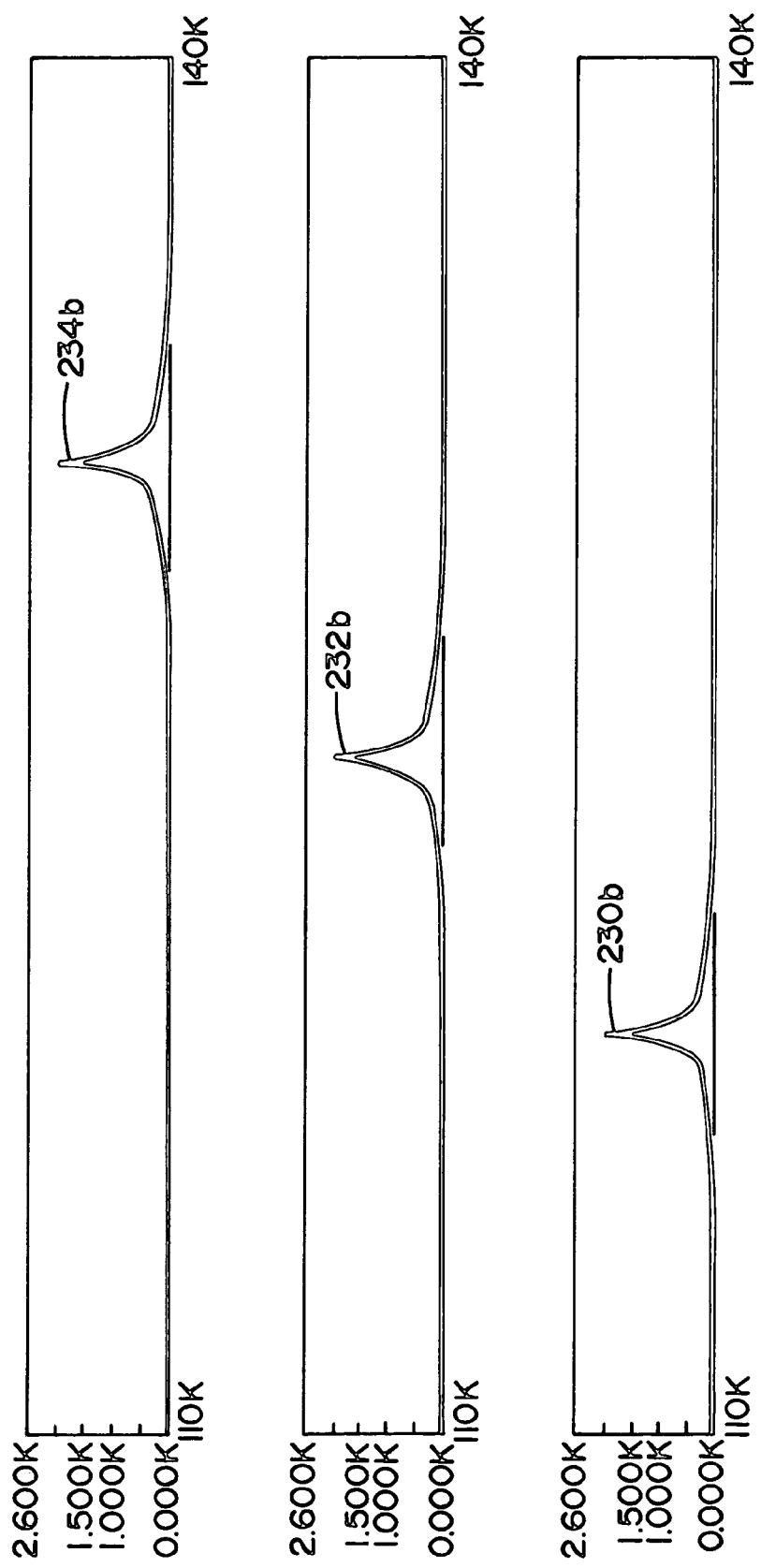
FIG. 11 is a series of frequency peaks caused by the series resonant circuits used in the preferred embodiment of the present invention employing the concepts disclosed in FIGS. 7-10; and, FIG. 12 is a partially cross-sectioned view of a device constructed in accordance with the present invention using two segments of the conductive electrode sleeve as shown in FIG. 6, utilizing an induction heating coil to magnetically constrict the plasma within the processing device.

The preferred practical implementation of the present invention is illustrated in FIGS. 7 and 8 wherein barrier assembly 200 has the general components of the embodiment shown in FIG. 2 and is used with an appropriate gas G introduced into annular gap 30 at inlet 52. In this structure, assembly 200 is approximately 2.0 meters long and has spaced conductive sleeves 40c-40g. These segments of conductive electrode sleeve 40 are driven by separate signals from a single power source 210 having a transformer output arrangement or network 220 for producing signals successively in the axially spaced rings or segments shown in FIG. 8. In this manner, a plasma wave is created within annular gap 30. The characteristics of the input to power source 210 are shown in FIGS. 9 and 10. Power source 210, includes series resonant circuits 230-238, best shown in FIG. 7. The capacitor and inductance of each circuit is adjusted to produce the desired resonant frequency for each of the series resonant circuits. In the embodiment illustrated, the resonant frequencies are 120 kHz, 125 kHz, 130 kHz, 135 kHz and 140 kHz. All circuits are driven by the signal from power supply 240 having common leads 242, 244. Transformer arrangement 220 provides a high voltage, high frequency signal in primary windings 250-258 as the resonant circuits resonate. The transformers each include secondary windings 260, 262 to drive circuits 270-278 having a common lead 280 connected to contact tube 10. Thus, as the signal across leads 242, 244 reaches the resonant frequency of one of the circuits 230-238, the circuit resonants and a high voltage, high frequency signal is created in output circuits 270-278 to drive the individual sleeves or segments 40c-40f. Thus, as the power source reaches the resonant frequency, a plasma is created in the area of annular gap 30 aligned with the individual conductive sleeves 40c, 40g. This action moves the plasma through gap 30. Power supply 240 is driven by a variable input voltage signal from voltage source 300 having an output signal 310 as shown in FIG. 9. In the illustrated embodiment, the output signal of voltage circuit or source 300 is a sawtooth waveform. At voltage 230a from source 300, series resonant circuit 230 is at its resonant frequency. This produces a voltage peak 230b as shown in FIG. 11. As signal 310 from voltage source 300 progresses, the input voltage between leads 242, 244 increases to higher levels as indicated by point 232a, 234a, 236a and 238a. At these points, the respective resonant circuit resonate to produce voltage spikes or high voltage signals as illustrated in FIG. 11. This concept is described in FIG. 10 wherein line 320 represents the output voltage of oscillator 240. As the voltage reaches value 230c, circuit 230 resonates. The same is true as the output of power supply 240 increases along line 320 to the various tuned frequency levels shown in FIG. 10. Thus, in each of the positions 230c, 232c, 234c, 236c and 238c, successive circuits are in the resonant state. This produces high voltage signals alternately from the various conductive sleeves 40c-40g shown in FIG. 8. In this manner, the plasma in annular gap 30 progresses as illustrated in FIG. 11. A typical wire drawing speed is 20 meters/second. If the barrier discharge device 200 is 2.0 meters long, the wire has a resonant time of 0.10 seconds in the plasma package. Assuming the voltage controlled oscillator 240 is swept through its range of operation in 5.0 ms, as shown in FIG. 9, any small increment of wire will be exposed to 20 wave crests as it moves through the tube. Thus, a plasma wave is used to interact with the moving wire. The velocity of the traveling wave is 400 meter/second or very near the sonic velocity. The sweep time of the voltage controlled oscillator may be adjusted to achieve optimum wave behavior. For an average frequency of 120 kHz, as assigned to circuit 230, the resonant circuit has 120 cycles to move through resonant storage. The resonant frequency may be adjusted by tuning the inductance and capacitance to achieve optimum performance.

Figure 12:
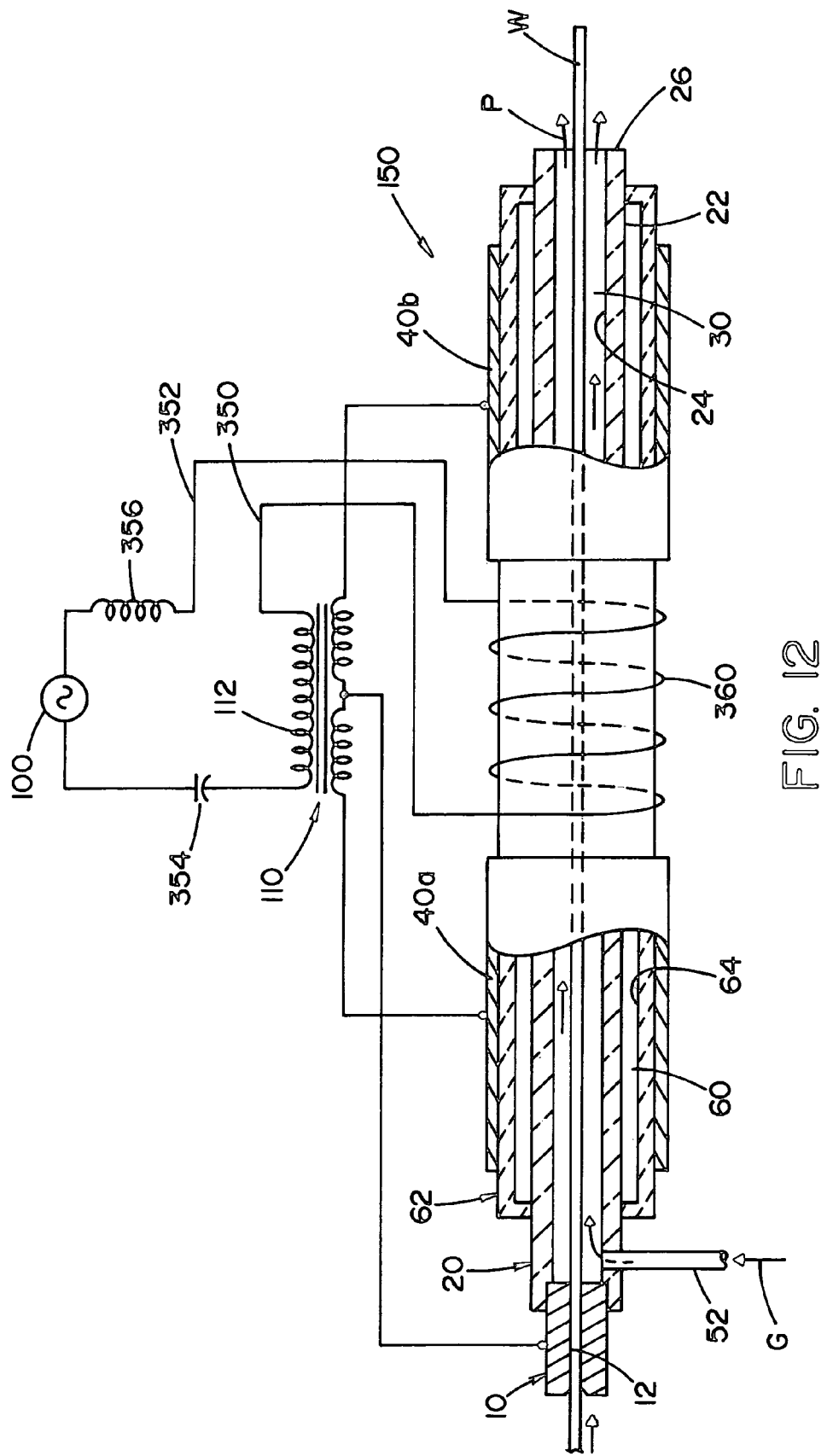

An aspect of the invention to achieve inductive heating and magnetic constraint of plasma P is illustrated in FIG. 12 wherein barrier device 150 is essentially the same as shown in FIG. 6 with a different input circuit to transformer 110 from power source 100. The signal used to create plasma in annular gap 30 as disclosed in FIG. 6 is modified slightly to provide output leads 350, 352. These leads make the input to transformer 112 a resonant circuit with the primary transformer. The phase of the current on the primary side of the transformer leads the secondary voltage by 90°. The circuit is tuned by capacitor 354 and additional inductor 356 so that an induction heating coil 360 around the chamber 30 will induce an axial magnetic field that will heat the wire and confine the plasma generally to sections between the magnetic field. Power source 100 operates at the resonant point of the primary side of the transformer. The frequency is controlled by the leakage inductance of the transformer primary winding and the added inductance 356 combined with the capacitance of capacitor 354. Other arrangements could be used for providing separate power source for coil 360 around barrier device 150 to move apart the plasma areas between the entrant end and exit end of device 150.

Several drive systems and structures have been disclosed for implementing the present invention. They may be combined into a variety of combinations according to the desire for processing the wire W.

Having thus defined the invention, the following is claimed:

1. A wire cleaning device having an outer surface with a given diameter and moving along a given path in a given direction, said device comprising: a conductive contact tube surrounding said path and electrically engageable with said wire as it moves along said path and through said contact tube; a dielectric sleeve adjacent said contact tube and extending in said given direction from said contact tube and around said path to define a passage between said dielectric sleeve and said wire; a cleaning gas inlet to said passage adjacent said contact tube to flow cleaning gas in said passage in said given direction; a conductive electrode sleeve around said dielectric sleeve; and terminals on said electrode sleeve and said contact tube to connect a power source, which generates a high frequency, between said electrode sleeve and said contact tube to create a plasma of said cleaning gas in said passage, wherein said dielectric sleeve is transparent; a sealed light emitting cylindrical chamber concentric with said path and located between said conductive electrode sleeve and said dielectric sleeve; wherein said chamber is filled with a light emitting gas with molecules electrically excited by said power source.

2. A wire cleaning device as defined in claim 1 wherein said cleaning gas is air.

3. A wire cleaning device as defined in claim 1 wherein said cleaning gas includes one or more of the gases selected from the group consisting of air, oxygen, nitrogen, argon, helium, neon, xenon, krypton, carbon dioxide, hydrogen, nitrous oxide and steam.

4. A wire cleaning device as defined in claim 1 wherein said high frequency is greater than 500 hertz.

5. A wire cleaning device as defined in claim 1 wherein said high frequency is greater than 18 kHz.

6. A wire cleaning device as defined in claim 1 wherein said high frequency is less than 2000 MHz.

7. A wire cleaning device as defined in claim 1 wherein said high frequency has a voltage greater than 1000 volts.

8. A wire cleaning device as defined in claim 1 wherein said high frequency has a voltage in the general range of 1-40 kV.

9. A wire cleaning device as defined in claim 1 wherein said passage has a width in the general range of 0.2-3.0 cm.

10. A wire cleaning device as defined in claim 1 wherein said passage has a width of about 0.3-0.5 cm.

11. A wire cleaning device as defined in claim 1 wherein said dielectric sleeve is formed from a material selected from the group consisting of ceramic, glass and polymer.

12. A wire cleaning device as defined in claim 1 wherein said cylindrical chamber comprises an outer dielectric sleeve between said dielectric sleeve and said conductive electrode sleeve.

13. A wire cleaning device as defined in claim 1 wherein said outer dielectric sleeve has an outer cylindrical surface and said conductive electrode has an inner cylindrical surface with one of said surfaces being a polished mirror.

14. A wire cleaning device as defined in claim 1 wherein said cylindrical chamber has a width of 0.2-6.0 mm.

15. A wire cleaning device as defined in claim 1 wherein said light emitting gas, by weight is:

| | |
|---|---|
| Helium | 50-100% |
| Nitrogen | 0-50% |
| Carbon dioxide | 0-15% |

-continued

| | |
|---|---|
| Argon | 0-5% |
| Krypton | 0-5% |
| Xenon | 0-5%. |

16. A wire cleaning device as defined in claim 1 wherein said plasma of said cleaning gas is a dielectric barrier discharge plasma.

17. A wire cleaning device as defined in claim 2 wherein said high frequency has a voltage in the general range of 1-40 kV.

18. A wire cleaning device as defined in claim 4 wherein said high frequency has a voltage in the general range of 1-40 kV.

19. A wire cleaning device as defined in claim 5 wherein said high frequency has a voltage in the general range of 1-40 kV.

20. A wire cleaning device as defined in claim 6 wherein said high frequency has a voltage in the general range of 1-40 kV.

21. A wire cleaning device as defined in claim 17 wherein said passage has a width in the general range of 0.2-3.0 cm.

22. A wire cleaning device as defined in claim 8 wherein said passage has a width in the general range of 0.2-3.0 cm.

23. A wire cleaning device as defined in claim 5 wherein said passage has a width in the general range of 0.2-3.0 cm.

24. A wire cleaning device as defined in claim 4 wherein said passage has a width in the general range of 0.2-3.0 cm.

25. A wire cleaning device as defined in claim 2 wherein said passage has a width in the general range of 0.2-3.0 cm.

26. A wire cleaning device as defined in claim 2 wherein said passage has a width of about 0.3-0.5 cm.

27. A wire cleaning device as defined in claim 5 wherein said passage has a width of about 0.3-0.5 cm.

28. A wire cleaning device as defined in claim 2 wherein said dielectric sleeve is formed of ceramic.

29. A wire cleaning device as defined in claim 12 wherein said outer dielectric sleeve has an outer cylindrical surface and said conductive electrode has an inner cylindrical surface with one of said surfaces being a polished mirror.

30. A wire cleaning device as defined in claim 13 wherein said cylindrical chamber has a width of 0.2-6.0 mm.

31. A wire cleaning device as defined in claim 30 wherein said chamber width is in the range of 1.0-2.0 mm.

32. A wire cleaning device as defined in claim 29 wherein said cylindrical chamber has a width of 0.2-6.0 mm.

33. A wire cleaning device as defined in claim 32 wherein said chamber width is in the range of 1.0-2.0 mm.

34. A wire cleaning device as defined in claim 12 wherein said cylindrical chamber has a width of 0.2-6.0 mm.

35. A wire cleaning device as defined in claim 34 wherein said chamber width is in the range of 1.0-2.0 mm.

36. A wire cleaning device as defined in claim 14 wherein said chamber width is in the range of 1.0-2.0 mm.

37. A wire cleaning device as defined in claim 14 wherein said light emitting gas, by weight is:

| | |
|---|---|
| Helium | 50-100% |
| Nitrogen | 0-50% |
| Carbon dioxide | 0-15% |
| Argon | 0-5% |
| Krypton | 0-5% |
| Xenon | 0-5%. |

38. A wire cleaning device as defined in claim 12 wherein said light emitting gas, by weight is:

| | |
|---|---|
| Helium | 50-100% |
| Nitrogen | 0-50% |
| Carbon dioxide | 0-15% |
| Argon | 0-5% |
| Krypton | 0-5% |
| Xenon | 0-5%. |

39. A wire cleaning device having an outer surface with a given diameter and moving along a given path in a given direction, said device comprising: a conductive contact tube surrounding said path and electrically engageable with said wire as it moves along said path and through said contact tube; a transparent dielectric sleeve adjacent said contact tube and extending in said given direction from said contact tube and around said path to define a passage between said dielectric sleeve and said wire; a cleaning gas inlet to said passage adjacent said contact tube to flow cleaning gas in said passage in said given direction; a conductive electrode sleeve around said dielectric sleeve; a sealed light emitting cylindrical chamber concentric with said path and positioned between said conductive electric sleeve and said dielectric sleeve; terminals on said electrode sleeve and said contact tube to connect a power source, which generates a high frequency, between said electrode sleeve and said contact tube to create a plasma of said cleaning gas in said passage; and, a supply of gaseous material and an outlet from said supply, said outlet connected to said passage whereby said material treats said moving wire by said plasma; wherein said gaseous material is vaporized alkali metal selected from the group consisting of potassium, sodium, cesium, rubidium, lithium, barium, calcium and combinations thereof.

40. A wire cleaning device as defined in claim 39 wherein said cleaning gas is air.

41. A wire cleaning device as defined in claim 39 wherein said high frequency is greater than 500 hertz.

42. A wire cleaning device as defined in claim 39 wherein said high frequency is greater than 18 kHz.

43. A wire cleaning device as defined in claim 39 wherein said high frequency has an rms voltage greater than 1000 volts.

44. A wire cleaning device as defined in claim 39 wherein said passage has a width in the general range of 0.2-3.0 cm.

45. A wire cleaning device as defined in claim 39 wherein said dielectric sleeve is formed from a material selected from the group consisting of ceramic, glass and polymer.

* * * * *